United States Patent Office 2,773,097
Patented Dec. 4, 1956

2,773,097

ALKALI SPLITTING OF SECONDARY AND TERTIARY FORMAMIDES

Harry E. Albert, Akron, and Richard W. Kibler, Cuyahoga Falls, Ohio, assignors to The Firestone Tire & Rubber Company, Akron, Ohio, a corporation of Ohio No Drawing. Application September 14, 1953, Serial No. 380,090

8 Claims. (Cl. 260—563)

This invention relates to the production of primary amines. More particularly, the invention relates to an improved method of producing primary amines from secondary and tertiary alkyl or cycloalkyl formamides.

It is known to produce amines by hydrolyzing a formamide in the presence of an aqueous alkali metal hydroxide. However, this method of producing amines is not particularly satisfactory because an aqueous mixture of the amine results. Separation of the pure anhydrous amine from such mixtures by distillation is very difficult because of the tendency of these amines to form azeotropes containing large percentages of water. An additional disadvantage of the use of aqueous alkali for the hydrolysis is that water is present with the sodium formate by-product after removal of the amine. This interferes with the recovery of concentrated formic acid from this sodium formate because the formic acid-water azeotrope (B. P. 107° C., 77.5% formic acid) boils so close to water (B. P. 100° C.). Further, the yield of amine resulting from the use of previously known methods has been low and consequently, these methods have not been commercially feasible.

An object of the present invention, therefore, is to provide an improved method of producing amines from formamides. Another object of the invention is to provide an improved method of converting secondary and tertiary alkyl or cycloalkyl formamides to corresponding primary amines in high yields. Still another object of the invention is to provide a greatly simplified method of obtaining primary amines. Still another object of the invention is to provide an improved method of producing primary amines accompanied by the simple recovery of valuable byproducts.

The above and further objects are obtained in accordance with the invention by reacting a secondary or tertiary alkyl or cycloalkyl formamide with a solid dry alkali metal hydroxide. The reaction involved in the invention is believed to be in accordance with the following equation:

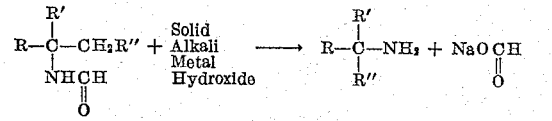

wherein R is a hydrocarbon radical, R' and R" are hydrogen, alkyl or cycloalkyl radicals or are combined as a divalent hydrocarbon, and R and R" can be combined as a divalent hydrocarbon radical.

An important consideration for obtaining the most desirable results of the invention is that the formamide utilized in the above reaction is in substantially an anhydrous condition. Carrying out the reaction in the absence of water greatly enhances the smoothness of the reaction. The formamides used in the practice of the invention can be obtained by any suitable means and are rendered anhydrous in any suitable manner. One convenient method for rendering a formamide anhydrous is to dry it over a suitable drying agent such as anhydrous sodium carbonate. Another suitable manner of rendering the formamide anhydrous is to dissolve the formamide in benzene or toluene and distill off the benzene or toluene; any water present is removed along with the benzene or toluene as an azeotrope.

The following formamides will illustrate, but are not intended to limit, the formamides which are suitable for practicing the invention.

N-cyclohexylformamide
N-isopropylformamide
N-sec-butylformamide
N-cyclopentylformamide
N-1-methylbutylformamide
N-tert-butylformamide
N-1-methylcyclohexylformamide
N-t-amylformamide
N-1-methylhexylformamide
N-tt-octylformamide
N-α-methylbenzylformamide
N-(α,α-dimethylbenzyl) formamide
N-nonylformamide
N-decylformamide
N-dodecylformamide In the practice of the invention one mole of the formamide is conveniently heated in the presence of a slight excess of the theoretically required alkali metal hydroxide. While sodium hydroxide is preferred, potassium and the other alkali metal hydroxides are also suitable. A more thorough understanding of the invention may be had by reference to the following examples.

*Example I*

One hundred one grams (one mole) of N-tert-butylformamide (purified by distillation) and 45.4 grams of solid sodium hydroxide were introduced into a three-necked flask equipped with a thermometer, a sealed stirrer and a distillation head having a thermometer and being connected to a condenser set for collection of product. This mixture was heated to 100° C. The reaction mixture solidified. In order to permit agitation of the reaction mixture, 200 ml. of mineral oil were added. Heating and stirring of the mixture was then continued for three hours at 120–130° C. and for an additional ½ hour at 180° C. The reaction product distilled at atmospheric pressure during the above heating periods. The distillate consisted of 72.8 grams of N-tert-butylamine. The yield was 100% of theory.

*Example II*

A 3-necked flask was provided with a gas inlet tube, a sealed stirrer and a Y connection leading to a reflux condenser and an additional funnel having a small reflux condenser, both condensers being supplied with water chilled to 10° C. Two moles of 87% sulfuric acid were placed in the flask, this acid concentration having been obtained by mixing 204 grams of 96% sulfuric acid with 21 grams of water. Forty-four ml. (1.14 mole) of liquid hydrogen cyanide and 58 grams (1.40 mole) of isobutylene were simultaneously added to the sulfuric acid while the reaction mixture was maintained at 20-25° C. The hydrogen cyanide was added over a period of ½ hour and the isobutylene was added over a period of ¾ hour. The reaction mixture was heated to 60–65° C. and allowed to cool to room temperature. One hundred fifty milliliters of water were added to the reaction mixture and the reaction mixture was then neutralized by the addition thereto of 300 ml. of concentrated aqueous ammonia. The organic layer, which was crude N-tert-butylformamide was then separated.

The crude N-tert-butylformamide and 45.4 grams of solid sodium hydroxide were introduced into a 3-necked flask equipped with a thermometer, a stirrer and a reflux condenser. The mixture was heated for three hours at 80° C. N-tert-butylamine was recovered from the resulting reaction product by distillation at atmospheric pressure in the temperature range of 46–50° C. The yield of amine amounted to 67.6 grams or 89.5% of theory.

*Example III*

Additional N-tert-butylformamide was produced in the same apparatus used in Example II. The proportion of ingredients and conditions of reaction differed from those of Example II only in the use of 51 grams (1.02 mole) instead of 58 grams of isobutylene and 75 ml. of water was used at the end of the reaction instead of 150 ml. The N-tert-butylformamide was reacted with 45.4 grams of solid sodium hydroxide in the same apparatus and under the same conditions used in Example II. N-tert-butylamine was recovered from the resulting reaction product by distillation at atmospheric pressure in the same temperature range referred to in Example II. The yield of the tertiary amine was 66.4 grams or 89.3% of theory.

*Example IV*

One mole (127.2 grams) of anhydrous cyclohexylformamide and 45 grams of solid sodium hydroxide were refluxed for four hours at 120° C. in the same apparatus utilized in Example II. As in the case of the previous examples, the resulting amine (cyclohexylamine) was recovered from the reaction product by distillation under atmospheric pressure. The cyclohexylamine was distilled in the temperature range of 126–134° C.

*Example V*

In a 3-necked flask provided with a thermometer, a reflux condenser, a sealed electric stirrer, standard addition funnel and an addition funnel having a reflux condenser cooled with 10° C. water, there was placed a mixture of 86 grams (one mole) of 95% cyclohexene and 14 grams of water. To this mixture 204 grams (two moles) of 96% sulfuric acid was added over a one hour period. While the mixture was maintained at 35–40° C. by external cooling, 47 mls. of liquid hydrogen cyanide was added to the mixture over a one hour period. After addition of the hydrogen cyanide, the mixture was stirred at a temperature below 40° C. for 15 minutes, heated to 90° C. and allowed to cool to room temperature. The reaction mixture was then neutralized by adding thereto 300 ml. of concentrated aqueous ammonia and 120 ml. of water while maintaining the mixture at less than 50° C. The organic layer (containing most of the cyclohexylformamide produced in the reaction) was separated from the aqueous layer. The aqueous layer was then extracted with 100 ml. of toluene. The toluene extract was combined with the organic layer and the resulting mixture was completely dried by distilling off the toluene (any water present was removed as a toluene azeotrope during this distillation).

The cyclohexylformamide obtained above was reacted with 44 grams of solid sodium hydroxide under the same conditions used in Example III and in the same apparatus used in Example II. The resulting cyclohexylamine was distilled off at atmospheric pressure in the temperature range of 124–135° C. The yield of the amine was 90.7 grams or 91.5% of theory.

The examples show the use of mineral oil as an aid to stirring the mixture of alkali metal hydroxide and the formamide. Similarly, other solvents or partial solvents for the formamide can be utilized in lieu of the mineral oil.

What is claimed:

1. Method of producing cyclohexylamine including reacting N-cyclohexylformamide with a solid alkali metal hydroxide, substantially in the absence of water.

2. Method of producing a primary amine which includes the step of reacting a N-substituted formamide with a solid alkali metal hydroxide, substantially in the absence of water.

3. Method of producing N-tert-butylamine which includes the step of reacting N-tert-butylformamide with a solid alkali metal hydroxide, substantially in the absence of water.

4. Method of producing N-tt-octylamine which includes the step of reacting N-tt-octylformamide with a solid alkali metal hydroxide, substantially in the absence of water.

5. Method of producing N-1-methylcyclopentylamine which includes the step of reacting N-1-methylcyclopentylformamide with a solid alkali metal hydroxide, substantially in the absence of water.

6. Method of producing N-sec-butylamine which includes the step of reacting N-sec-butylformamide with a solid alkali metal hydroxide, substantially in the absence of water.

7. Method of producing primary amines including the step of reacting a formamide selected from the group consisting of secondary and tertiary alkyl formamides with a solid alkali metal hydroxide, substantially in the absence of water.

8. Method of producing primary amines which includes the step of reacting a N-substituted formamide with a solid alkali metal hydroxide, said formamide being in substantially an anhydrous condition.

References Cited in the file of this patent

UNITED STATES PATENTS

| | | |
|---|---|---|
| 2,457,660 | Gresham et al. | Dec. 28, 1948 |
| 2,632,022 | Bortnick | Mar. 17, 1953 |
| 2,632,023 | Bortnick | Mar. 17, 1953 |